United States Patent [19]

Hillis et al.

[11] Patent Number: 4,805,173
[45] Date of Patent: Feb. 14, 1989

[54] ERROR CONTROL METHOD AND APPARATUS

[75] Inventors: W. Daniel Hillis, Cambridge; Brewster Kahle, Somerville, both of Mass.

[73] Assignee: Thinking Machines Corporation, Cambridge, Mass.

[21] Appl. No.: 939,599

[22] Filed: Dec. 10, 1986

Related U.S. Application Data

[63] Continuation-in-part of Ser. No. 907,671, Sep. 15, 1986.

[51] Int. Cl.⁴ .............................................. G06F 11/10
[52] U.S. Cl. ..................................................... 371/38
[58] Field of Search .................................. 371/37, 38; 364/200 MS File, 900 MS File

[56] References Cited

U.S. PATENT DOCUMENTS

| | | | |
|---|---|---|---|
| 4,319,356 | 3/1982 | Kocol et al. | 371/38 |
| 4,345,328 | 8/1982 | White | 371/38 |
| 4,561,095 | 12/1985 | Khan | 371/38 |
| 4,593,393 | 6/1986 | Mead et al. | 371/37 |
| 4,646,304 | 2/1987 | Fossati et al. | 371/38 |

Primary Examiner—Charles E. Atkinson
Attorney, Agent, or Firm—Pennie & Edmonds

[57] ABSTRACT

A method and apparatus are described for error control and correction which operates across multiple processors and multiple computer memories. In accordance with the invention, data signals from a plurality of processors are applied in parallel to a syndrome generator that generates a syndrome related to such signals. The syndrome is then stored in parallel in a plurality of read/write memories at the same address as the data signals from which the syndrome was generated. When the data signals are read from memory, they are again provided to the syndrome generator which again generates a new syndrome. At the same time the old syndrome signals stored at the same memory addresses are read from memory and compared with the new syndrome. If the two syndromes are the same, there is no error and the data signals are valid. If the syndromes are different, a syndrome decoder determines if sufficient information is available in the syndrome signals to correct the error and does so if it can.

8 Claims, 4 Drawing Sheets

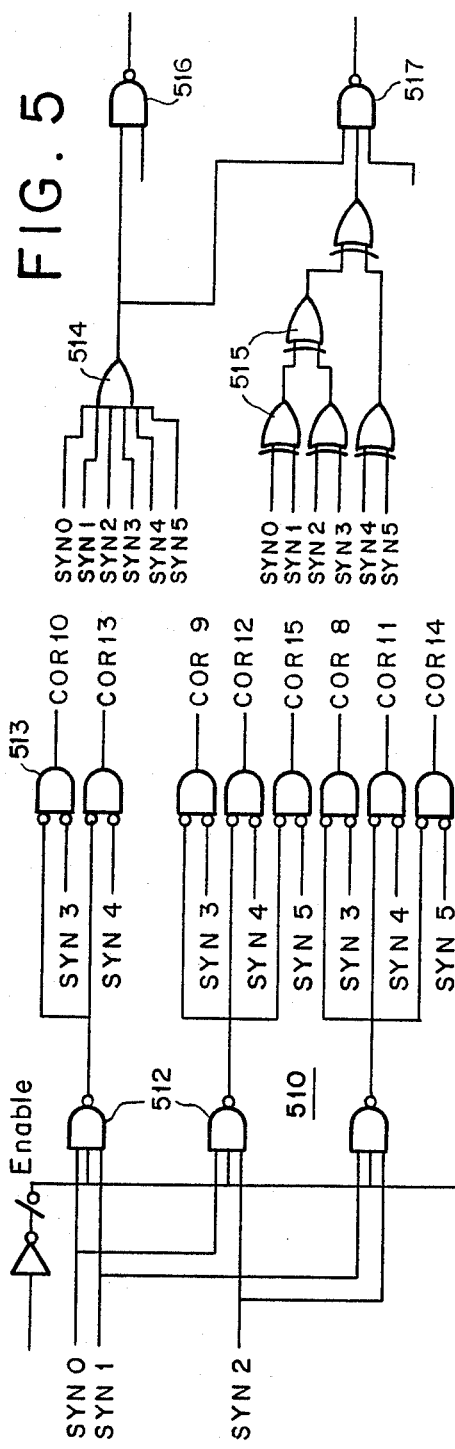
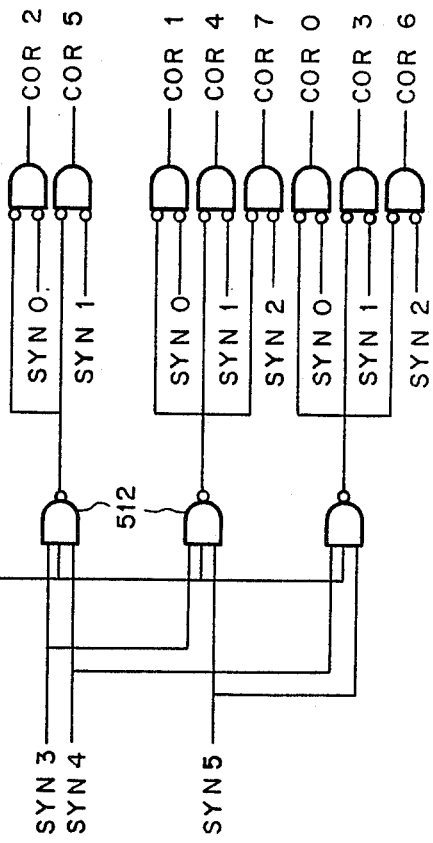
FIG. 5
FIG. 4

1

ERROR CONTROL METHOD AND APPARATUS

CROSS REFERENCE TO RELATED APPLICATIONS

This application is a continuation-in-part of application Ser. No. 907,671, filed Sept. 15, 1986 for "Parallel Processor Error Checking" which is incorporated herein by reference.

Related applications are "Parallel Processor", Ser. No. 499,474 and "Parallel Processor/Memory Circuit", Ser. No. 499,471, now U.S. Pat. No. 4,709,327 issued 11/24/87, both filed May 31, 1983, "Method and Apparatus for Routing Message Packets", Ser. No. 671,835, filed Nov. 15, 1984, now U.S. Pat. No. 4,598,400, "Method and Apparatus for Interconnecting Processors in a Hyper-Dimensional Array", Ser. No. 740,943, filed May 31, 1985, and "Very Large Scale Computer", Ser. No. 902,290, filed Aug. 29, 1986, and "Massively Parallel Processor", Ser. No. 924,090, filed Oct. 28, 1986, all of which are incorporated herein by reference.

BACKGROUND OF THE INVENTION

This relates to error control methods and apparatus especially useful in parallel processors such as those disclosed in the above-referenced U.S. Ser. Nos: 499,471 and 499,474 applications and U.S. Pat. No. 4,598,400.

As shown in FIG. 1A of U.S. Pat. No. 598,400 which is reproduced in FIG. 1, the computer system of those applications comprises a mainframe computer 10, a microcontroller 20, an array 30 of parallel processing integrated circuits 35, a data source 40, a first buffer and multiplexer/demultiplexer 50, first, second, third and fourth bidirectional bus control circuits 60, 65, 70, 75, a second buffer and multiplexer/demultiplexer 80, and a data sink 90. Mainframe computer 10 may be a suitably programmed commercially available general purpose computer such as a VAX ™ computer manufactured by Digital Equipment Corp. Microcontroller 20 is an instruction sequencer of conventional design for generating a sequence of instructions that are applied to array 30 by means of a thirty-two bit parallel bus 22. Microcontroller 20 receives from array 30 a signal on line 26. This signal is a general purpose or GLOBAL signal that can be used for data output and status information. Bus 22 and line 26 are connected in parallel to each IC 35. As a result, signals from microcontroller 20 are applied simultaneously to each IC 35 in array 30 and the signal applied to microcontroller 20 on line 26 is formed by combining the signal outputs from all of ICs 35 of the array.

Array 30 contains thousands of identical ICs 35; and each IC 35 contains several identical processor/memories 36. In the embodiment disclosed in U.S. Pat. No. 4,598,400, it is indicated that the array may contain up to 32,768 ($=2^{15}$) identical ICs 35; and each IC 35 may contain 32 ($=2^5$) identical processor/memories 36. At the time of filing of this application for patent, arrays containing up to 4096 ($=2^{12}$) identical ICs 35 containing 16 ($=2^4$) identical processor/memories each have been manufactured and shipped by the assignee as Connection Machine ™ computers.

SUMMARY OF THE INVENTION

As in any computer, error control and correction are important considerations. In the case of a parallel computer of thousands of identical processors, they are even more important because the vast increases in the number of processors and number of processing operations per unit time inevitably reduces the mean time between failures across the entire computer even if state of the art improvements are made in the error rate per number of processing operations.

In the present invention we have devised a method and apparatus for error control and correction which operates across multiple processors and multiple computer memories. In accordance with the invention, data signals from a plurality of processors are applied in parallel to a syndrome generator that generates a syndrome related to such signals. The syndrome is then stored in parallel in a plurality of read/write memories at the same address as the data signals from which the syndrome was generated. When the data signals are read from memory, they are again provided to the syndrome generator which again generates a new syndrome. At the same time the old syndrome signals stored at the same memory addresses are read from memory and compared with the new syndrome. If the two syndromes are the same, there is no error and the data signals are valid. If the syndromes are different, a syndrome decoder determines if sufficient information is available in the syndrome signals to correct the error and does so if it can.

BRIEF DESCRIPTION OF DRAWINGS

These and other objects, features and advantages of the invention will be more readily apparent from the following description of a preferred embodiment of the invention in which:

FIGS. 4 and 5 are schematic diagrams illustrating further details of a second element of FIG. 2.

DETAILED DESCRIPTION OF PREFERRED EMBODIMENT

Figure 1:
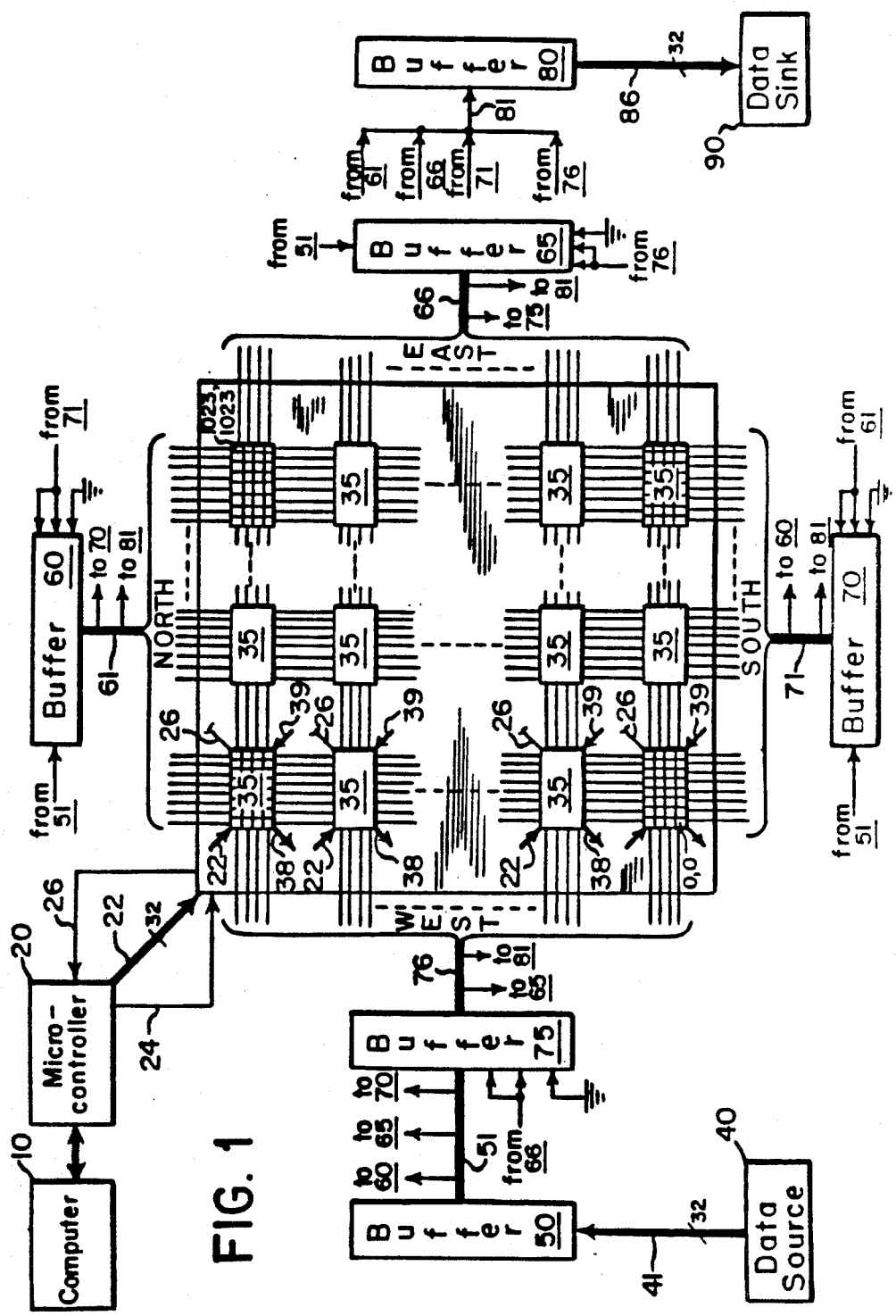
FIG. 1 is a schematic diagram of a parallel processor of the prior art.
Figure 2:
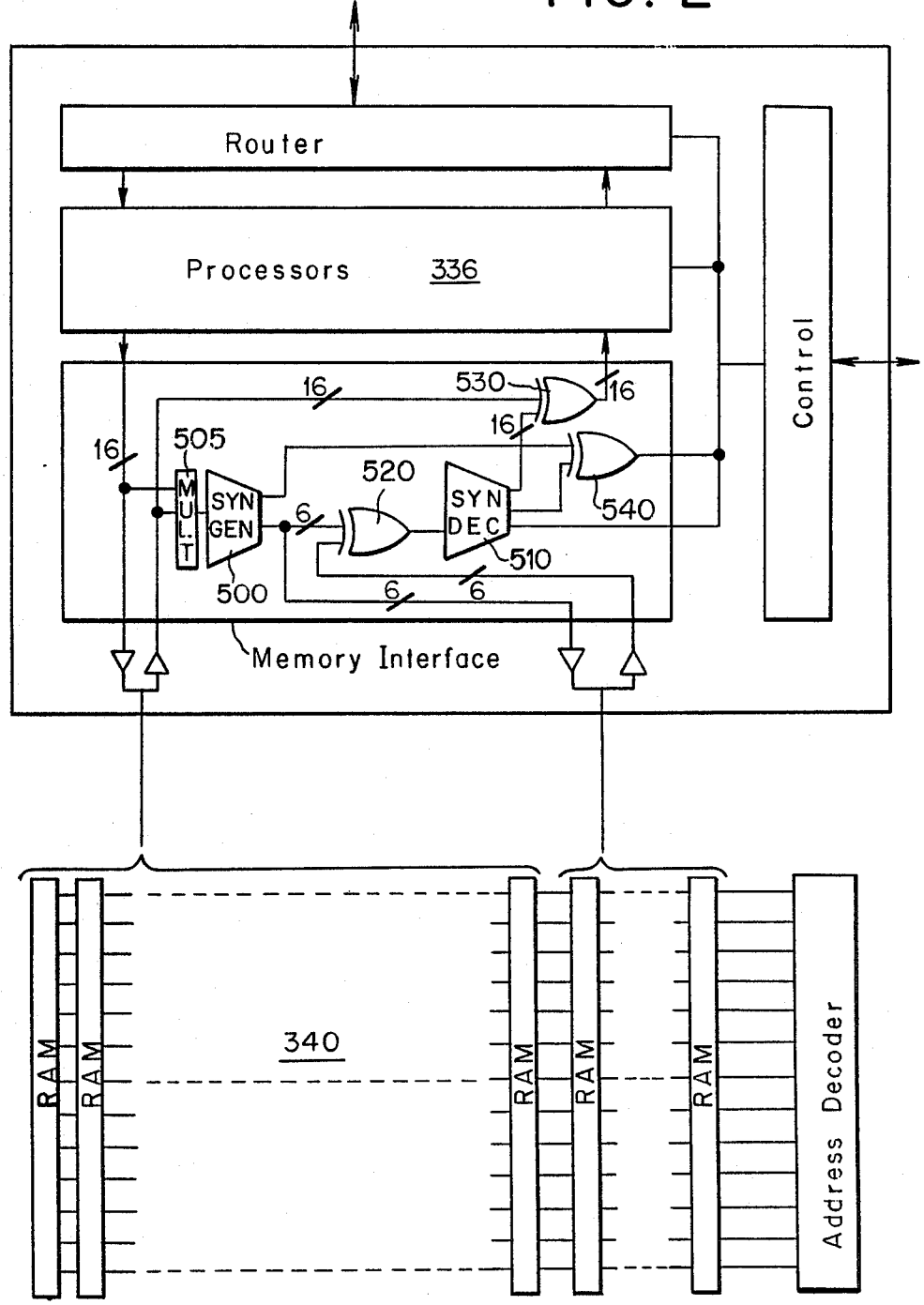
FIG. 2 is a schematic diagram illustrating an error-correction circuit for use in the system of FIG. 1.
Figure 3:
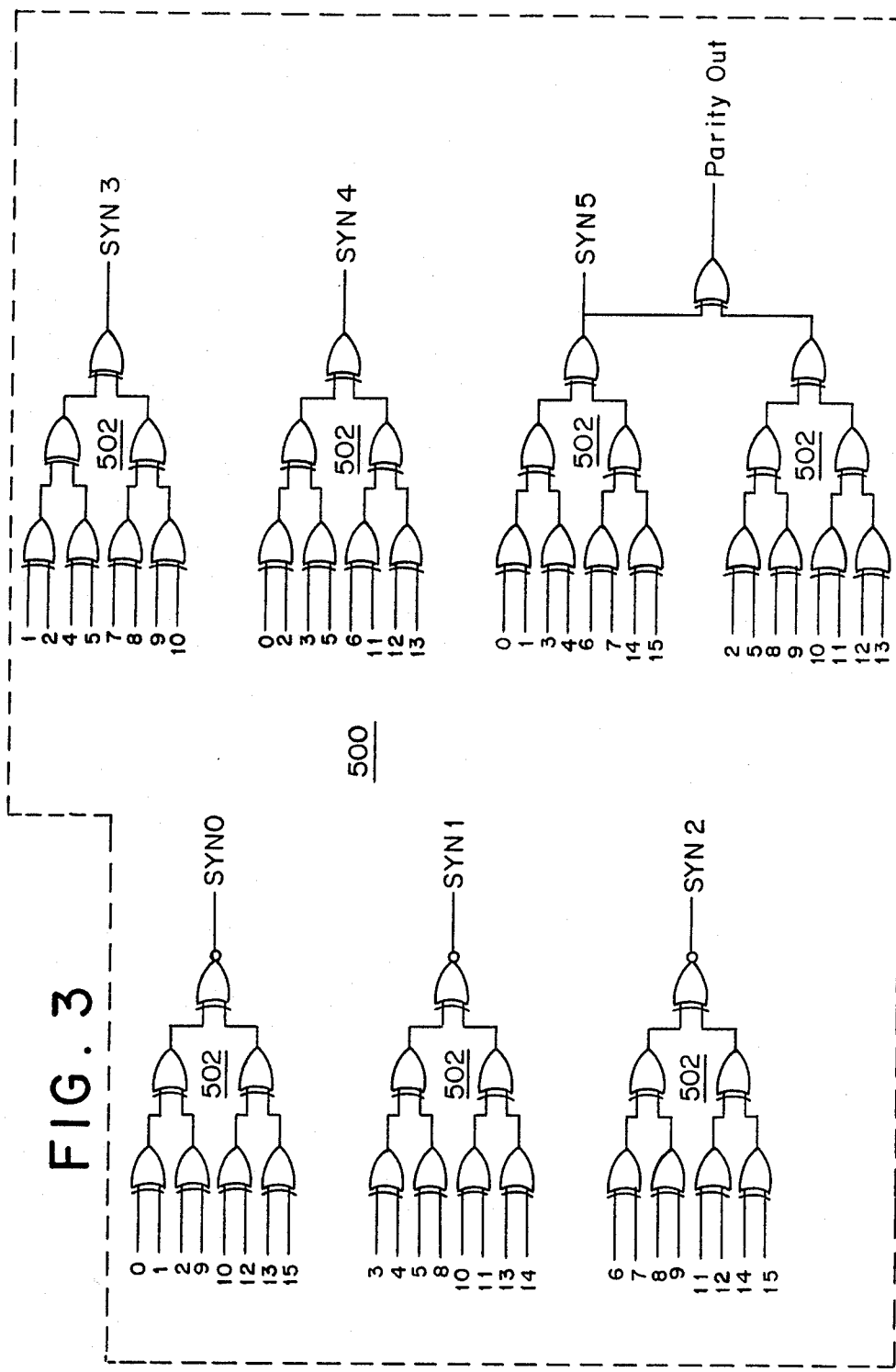
FIG. 3 is a schematic diagram illustrating further details of an element of FIG. 2.

FIG. 3 of the above-referenced application for "Parallel Processor Error Checking" illustrates a generalized representation of the error correcting scheme of the present invention; and FIG. 4 illustrates the application of this scheme to a multiprocessor, multimemory environment. Specific details of such application are set forth in FIGS. 2-5 herein.

As shown in FIG. 2, the processors of the parallel computer illustratively are implemented in an integrated circuit 334. Each circuit contains sixteen identical processors 336, a control unit 337, a router 338, and a memory interface 339. Several such integrated circuits (e.g., thirty-two) are mounted on a single circuit board. Each circuit board also mounts 4K bits of random access memory (RAM) 340 for each processor 336 on the board. Illustratively, this memory is provided in the form of twenty-two 4K×1 bit RAM integrated circuits 342 associated with each integrated circuit 334. In each such memory each of sixteen 4K×1 bit slices functions as the memory for a different one of the sixteen identical processors 336 as set forth in more detail below. The remaining six 4K×1 bit slices store parity or syndrome bits calculated as detailed below for the data stored in the memories of the sixteen identical processors. Integrated circuits 342 are addressed in parallel by address decoder 344 so that parallel data is read from or written to each integrated circuit at the address specified by the address decoder. In practice a single address decoder can be used to control parallel addressing of all the RAM integrated circuits 342 on a single circuit board or even in the entire computer.

Integrated circuit 334 contains about 50,000 active devices and illustratively is implemented in a CMOS die about 1 cm² in area. The die is packaged in a square ceramic carrier having input/output pins that include a set of instruction pins, a set of memory pins, a set of cube pins, a set of NEWS pins, a clock input, a global pin and an error pin. Instructions are applied to control unit 337 via the instruction pins so as to control the operation of the processors and router. Under direction of the control unit, the processors of an integrated circuit take data from the memory associated with that integrated circuit, perform arithmetic and logical operations on such data, and store the results in the memory. Advantageously, the memory pins are bidirectional, and all transfers to and from memory take place over the memory pins. The router is responsible for routing addressed messages between integrated circuits 334 and delivering the messages to the destination specified by the address. The router communicates with the routers of other integrated circuits 334 through the cube pins. Advantageously, the cube pins are also bidirectional in order to reduce the pinout and wiring between adjacent routers in the hypercube.

The memory is read in parallel one row at a time to produce data outputs on sixteen output lines and parity outputs on six additional output lines. These signals are then applied in parallel to error control circuitry for detection of parity errors and correction of such errors if possible.

Illustrative such apparatus is shown in FIGS. 2-5. As shown in FIG. 2, the error control circuitry comprises a syndrome generator 500, a multiplexer 505, a syndrome decoder 510 and exclusive OR gates 520, 530, 540. The sixteen data output lines from a RAM 340 and the sixteen data output lines from the sixteen processors 336 are applied via multiplexer 505 at different times as inputs to syndrome generator 500. The syndrome generator generates six syndrome signals by performing modulo 2 addition on the bit values on selected ones of the data output lines from processors 336 or the data output lines from RAM 340 as shown in Table I where the plus sign indicates modulo 2 addition:

TABLE I

| Syndrome signal | Syndrome input lines whose signals are summed |
|---|---|
| 0 = | 0 +1 +2             +9 +10     +12 +13     +15 |
| 1 = |      +3 +4 +5      +8     +10 +11  +13 +14 |
| 2 = |           +6+7+8 +9         +11+12     +14+15 |
| 3 = | +1 +2    +4 +5    +7+8 +9 +10 |
| 4 = | 0    +2 +3    +5+6             +11+12 +13 |
| 5 = | 0 +1    +3+4    +6+7                     +14+15 |

In addition, the syndrome generator also generates an even parity output signal by performing modulo 2 addition on the bit values on all of the data output lines from processors 336 or from RAM 340.

Specific circuitry for implementing the syndrome generator is disclosed in FIG. 3 and comprises arrays of exclusive OR gates 502 connected as shown to syndrome input lines 0-15 to produce syndrome output signals 0-5 in accordance with Table I as well as a parity output signal.

In the case where the data applied to syndrome generator 500 is parallel data being written from the sixteen processors 336 to sixteen memories, the six syndrome outputs are written into six memories at the same addresses and at the same time as the data bits used in generating the syndrome outputs are stored in the sixteen memories.

In the case where the data applied to syndrome generator 500 is data being read in parallel from the sixteen memories, the six syndrome outputs generated by syndrome generator 500 from this data are compared in parallel by six exclusive OR gates 520 with the six syndrome signals that were stored at the same address as the sixteen data bits. The results of these comparisons are provided to syndrome decoder 510. Syndrome decoder determines if there are any discrepancies between the outputs from the syndrome generator and the syndrome signals read from the memories and decides whether an error can be corrected. If there are no discrepancies, the output of each of the six exclusive OR gates 520 will be a low signal. In this case, the output of the syndrome decoder on each of the sixteen lines to the sixteen exclusive OR gates 530 will be low and the output on the line to exclusive OR gate 540 will be high. As a result, the signals on the sixteen data output lines that are applied to exclusive OR gates 530 will not be changed and these signals will be provided to the sixteen processors 336. Likewise, the even parity output signal from syndrome generator 500 will not be changed.

If, however, there is a discrepancy between the six syndrome signals and the six parity values, there is an error in the signals from the RAM; and the syndrome decoder will attempt to correct for this. In particular, it will generate a correction signal for each of the sixteen data output lines by forming the logical AND of different sets of three of the six outputs of exclusive OR gates 520. It will also determine if the error can be corrected since only some errors can be corrected with the limited number of syndrome bits that are used.

Specific apparatus for the syndrome decoder 510 is shown in FIGS. 4 and 5. The inputs to these circuits are the six output signals SYN0-SYN5 from exclusive OR gates 520. As shown in FIG. 4, the correction generation circuitry comprises a first array of six NAND gates 512 connected as indicated and a second array of sixteen AND gates 513 with inverting inputs likewise connected as indicated to produce correction signals COR-0-COR15. As will be apparent, the connection pattern between inputs and outputs of the circuitry of FIG. 4 is also specified by Table I in that the entries in each of the sixteen columns of Table I specify the three signals from exclusive OR gates 520 that are used to generate an output correction signal.

As shown in FIG. 5, the circuitry for determining if an error can be corrected comprises an OR gate 514, an array of five exclusive OR gates 515, and two NAND gates 516, 517. OR gate 514 detects if there is any discrepancy between the six syndrome signals from syndrome generator 500 and the six syndrome signals from RAM. Its inputs are the six signals SYN0-SYN6 from exclusive OR gates 510. Its output is supplied to NAND gates 516, 517 with the output of NAND gate 516 being applied to exclusive OR gate 540 as indicated above. The array of five exclusive OR gates determines if the number of discrepancies is correctable or not. If it is not correctable, the output of NAND gate 517 is low.

As will be apparent to those skilled in the art, numerous modifications may be made in the above-described invention.

What is claimed is:

1. Error detection circuitry for use in a parallel processor comprising:

a plurality of processors and at least one read/write memory, a plurality of inputs equal in number to the number of processors, each input being connected to a different processor, means for providing signals in parallel from the plurality of processors to said inputs, means for generating a syndrome from said parallel signals on said inputs, such that the syndrome is generated from signals from more than one processor, means for storing in parallel in said memory said parallel signals and said syndrome generated therefrom, such that a syndrome generated from signals from more than one processor is associated in said memory with said signals from more than one processor, means for reading from said memory said parallel signals and the syndrome associated therewith, means for generating a new syndrome from said parallel signals read from memory, and means for comparing the syndrome read from said parallel memory with the new syndrome generated from the parallel signals read from said memory.

2. The apparatus of claim 1 further comprising means for determining from the syndrome read from memory and the new syndrome generated if an error detected by said comparing means can be corrected.

3. The apparatus of claim 2 further comprising means for correcting an error detected by said comparing means.

4. The apparatus of claim 1 wherein signals from different processors are stored in different memories.

5. A method of detecting errors in a parallel processor comprising the steps of:

providing signals from a plurality of processors in parallel to a plurality of inputs equal in number to the number of processors, such that each signal is provided to a different input, generating a syndrome from said parallel signals on said inputs, such that the syndrome is generated from signals from more than one processor, storing in parallel in at least one read/write memory said parallel signals and said syndrome generated therefrom, such that a syndrome generated from signals from more than one processor is associated in said memory with said signals from more than one processor, reading from said memory said parallel signals and the syndrome associated therewith, generating a new syndrome from the parallel signals read from the memory, and comparing the syndrome read from said parallel memory with a new syndrome generated from the parallel signals read from said memory.

6. The method of claim 5 further comprising the step of determining if an error detected in said comparing step can be corrected.

7. The method of claim 6 further comprising the step of correcting an error detected in said comparing step.

8. The method of claim 5 wherein signals from different processors are stored in different memories.

* * * * *